United States Patent
Matsuda et al.

(10) Patent No.: US 11,299,211 B2
(45) Date of Patent: Apr. 12, 2022

(54) LOWER VEHICLE-BODY STRUCTURE OF ELECTRIC VEHICLE

(71) Applicant: MAZDA MOTOR CORPORATION, Hiroshima (JP)

(72) Inventors: Yamato Matsuda, Hiroshima (JP); Nobuyuki Nakayama, Aki-gun (JP); Morihide Yamada, Hiroshima (JP); Katsuhito Kouno, Hiroshima (JP); Toshihiro Takebayashi, Kure (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 129 days.

(21) Appl. No.: 16/820,420

(22) Filed: Mar. 16, 2020

(65) Prior Publication Data
US 2020/0361541 A1  Nov. 19, 2020

(30) Foreign Application Priority Data

May 15, 2019 (JP) .............................. JP2019-092088

(51) Int. Cl.
| | |
|---|---|
| B62D 25/20 | (2006.01) |
| B62D 21/09 | (2006.01) |
| B62D 21/15 | (2006.01) |
| B62D 27/02 | (2006.01) |
| B60K 1/04 | (2019.01) |

(52) U.S. Cl.
CPC ......... *B62D 25/2036* (2013.01); *B62D 21/09* (2013.01); *B62D 21/155* (2013.01); *B62D 27/023* (2013.01); *B60K 1/04* (2013.01); *B60K 2001/0427* (2013.01)

(58) Field of Classification Search
CPC .. B62D 25/2036; B62D 21/09; B62D 21/155; B62D 27/023; B62D 25/20; B62D 25/2045; B60K 1/04; B60K 2001/0427; B60K 2001/0438
USPC .......................................................... 296/204
See application file for complete search history.

(56) References Cited

U.S. PATENT DOCUMENTS

| | | | | |
|---|---|---|---|---|
| 6,491,337 | B2* | 12/2002 | Averdiek | B62D 25/20 296/203.01 |
| 7,281,971 | B2* | 10/2007 | Tohda | B60H 1/00 237/12.3 B |
| 9,873,460 | B2* | 1/2018 | Tatsuwaki | B62D 25/14 |
| 10,688,856 | B2* | 6/2020 | Kasai | B60L 50/66 |
| 2013/0229030 | A1 | 9/2013 | Yamaguchi et al. | |

FOREIGN PATENT DOCUMENTS

| | | |
|---|---|---|
| JP | 2013-147137 A | 8/2013 |
| JP | WO2012/063393 A1 | 5/2014 |

* cited by examiner

*Primary Examiner* — Pinel E Romain
(74) *Attorney, Agent, or Firm* — Studebaker & Brackett PC

(57) ABSTRACT

A lower vehicle-body structure of an electric vehicle to increase resistance to lateral collision and also improve front-end collision load transfer performance of a tunnel. The lower vehicle-body structure of an electric vehicle includes a floor having a tunnel formed in a front part at a middle in a vehicle-width direction; and a floor cross member spanning, above the floor, between side sills disposed on opposite sides of the floor. Also, a rear end of the tunnel is located directly in front of the floor cross member, and reinforcing brackets are provided extending from the tunnel toward an upper end of the floor cross member and connected to the upper end of the floor cross member.

15 Claims, 9 Drawing Sheets

LOWER VEHICLE-BODY STRUCTURE OF ELECTRIC VEHICLE

BACKGROUND

Technical Field

The present disclosure relates to a lower vehicle-body structure of an electric vehicle including: a dash panel; a floor having a tunnel formed in a front part at a middle in a vehicle-width direction; and a floor cross member spanning, above the floor, between side sills disposed on opposite sides of the floor.

Background Art

Electric vehicles such as electric automobiles or range extender vehicles including only a generator engine do not require a long exhaust pipe arranged along a vehicle front-rear direction in a vehicle-width-direction middle part below a floor, and thus do not require a floor tunnel (tunnel) having an internal space that can house the exhaust pipe, and formed in the vehicle-width-direction middle part of the floor to expand upward over the entire length in the vehicle front-rear direction.

Thus, for example, for an electric vehicle in which a cable such as a power cable extending rearward from a motor room in a vehicle body front part is connected to an upper front end of a battery unit, a front part of the battery unit needs to be expanded upward (toward a floor) to ensure a space for connection of the cable, and accordingly, a floor tunnel is sometimes partially formed only in a front part of the floor in a vehicle front-rear direction.

In a known configuration, even for an electric vehicle that does not require a floor tunnel formed in a floor to expand over the entire length in a vehicle front-rear direction as described above, the floor tunnel is formed over the entire length in the vehicle front-rear direction so that the floor tunnel functions as a load path at the time of front-end collision of the vehicle, thereby increasing resistance to a front-end collision, as described, for example, in National Publication of International Patent Application No. 2012-063393 and Japanese Patent Laid-Open No. 2013-147137.

National Publication of International Patent Application No. 2012-063393 discloses a structure including left and right floor cross members connecting side sills and a floor tunnel (see FIG. 8 in National Publication of International Patent Application No. 2012-063393). Japanese Patent Laid-Open No. 2013-147137 discloses a structure including a floor cross member connecting left and right side sills over a tunnel (see FIG. 1 in Japanese Patent Laid-Open No. 2013-147137).

However, to increase resistance to lateral collision of a vehicle, a floor cross member is preferably linearly continuously provided between side sills on opposite sides of a floor.

Thus, when the floor tunnel extends in the vehicle front-rear direction to separate the floor cross members in order to precede the function of the floor tunnel as the load path for a front-end collision load as in National Publication of International Patent Application No. 2012-063393, resistance to lateral collision of the floor cross members may be reduced. Also in Japanese Patent Laid-Open No. 2013-147137, resistance to lateral collision of an area of the floor cross member over the tunnel in a vehicle-width direction may be reduced.

On the other hand, as described above, for the configuration including the floor tunnel partially formed in the front part of the floor, the floor cross member can be linearly continuously formed in the vehicle-width direction. However, the floor cross member prevents the floor tunnel from extending in the vehicle front-rear direction, which may reduce resistance to front-end collision of the floor tunnel. Specifically, there is a room to study about achieving both resistance to front-end collision and resistance to lateral collision of a lower vehicle-body structure of an electric vehicle.

Accordingly, the present disclosure provides a lower vehicle-body structure of an electric vehicle that can increase resistance to lateral collision and also improve front-end collision load transfer performance of a tunnel.

SUMMARY

The present disclosure provides a lower vehicle-body structure of an electric vehicle including a dash panel; a floor having a tunnel formed in a front part below the dash panel at a middle in a vehicle-width direction, the tunnel housing an expanding portion expanding upward of a battery unit disposed below the floor; and a floor cross member spanning, above the floor, between side sills disposed on opposite sides of the floor. Also, a rear end of the tunnel is located directly in front of the floor cross member, and a reinforcing bracket is provided extending from the tunnel toward the floor cross member on a rear side of the tunnel so as to be spaced upward from the floor, and connected to an upper part of the floor cross member.

The above described configuration can increase resistance to lateral collision and also improve front-end collision load transfer performance of the tunnel.

As an aspect of the present disclosure, the reinforcing bracket includes a tunnel reinforcing bracket extending rearward from the tunnel, and a console support bracket provided on a rear side of the tunnel reinforcing bracket and connected to a rear part of the tunnel reinforcing bracket and the floor cross member on the rear side of the tunnel reinforcing bracket.

The above described configuration can transfer a front-end collision load further to the rear side via the console support bracket.

As an aspect of the present disclosure, the tunnel reinforcing bracket is connected to an upper end of the floor cross member via the console support bracket.

According to the above described configuration, the console support bracket is connected to the floor cross member, and thus the front-end collision load can be transferred from the tunnel reinforcing bracket to the floor cross member via the console support bracket.

As an aspect of the present disclosure, the tunnel reinforcing bracket and the console support bracket each include opposite side walls and an upper wall to form an inverted U-shaped section in front view of the vehicle, the opposite side walls and the upper wall of the tunnel reinforcing bracket are welded to the tunnel, the opposite side walls and the upper wall of the console support bracket are connected to the floor cross member by fasteners, and the opposite side walls and the upper walls of the tunnel reinforcing bracket and the console support bracket are connected by fasteners.

According to the above described configuration, the front-end collision load can be efficiently transferred, via ridges formed between the opposite side walls and the upper walls, from the tunnel reinforcing bracket as a vehicle body component integrally joined to a vehicle body (that is, welded to the tunnel) to the console support bracket as a vehicle component retrofitted to the vehicle body component (that is, connected to the floor cross member by the fasteners).

As an aspect of the present disclosure, a recess is continuously formed across the upper wall of the tunnel reinforcing bracket and the upper wall of the console support bracket.

According to the above described configuration, forming the recess can increase section stiffness of the upper walls and further improve front-end collision load transfer performance.

As an aspect of the present disclosure, the lower vehicle-body structure further includes a reinforcing element including opposite side walls and an upper wall to form an inverted U-shaped section in front view of the vehicle, and mounted to the floor cross member across the tunnel reinforcing bracket and the console support bracket.

According to the above described configuration, providing the reinforcing element can further improve front-end collision load transfer performance from the tunnel reinforcing bracket to the console support bracket.

As an aspect of the present disclosure, the lower vehicle-body structure further includes a connecting bracket connecting an upper wall of the tunnel and the upper wall of the reinforcing bracket above the tunnel.

According to the above described configuration, the connecting bracket can prevent displacement between the tunnel and the reinforcing bracket.

The present disclosure can increase resistance to lateral collision and also improve front-end collision load transfer performance of the tunnel.

DETAILED DESCRIPTION

Figure 1:
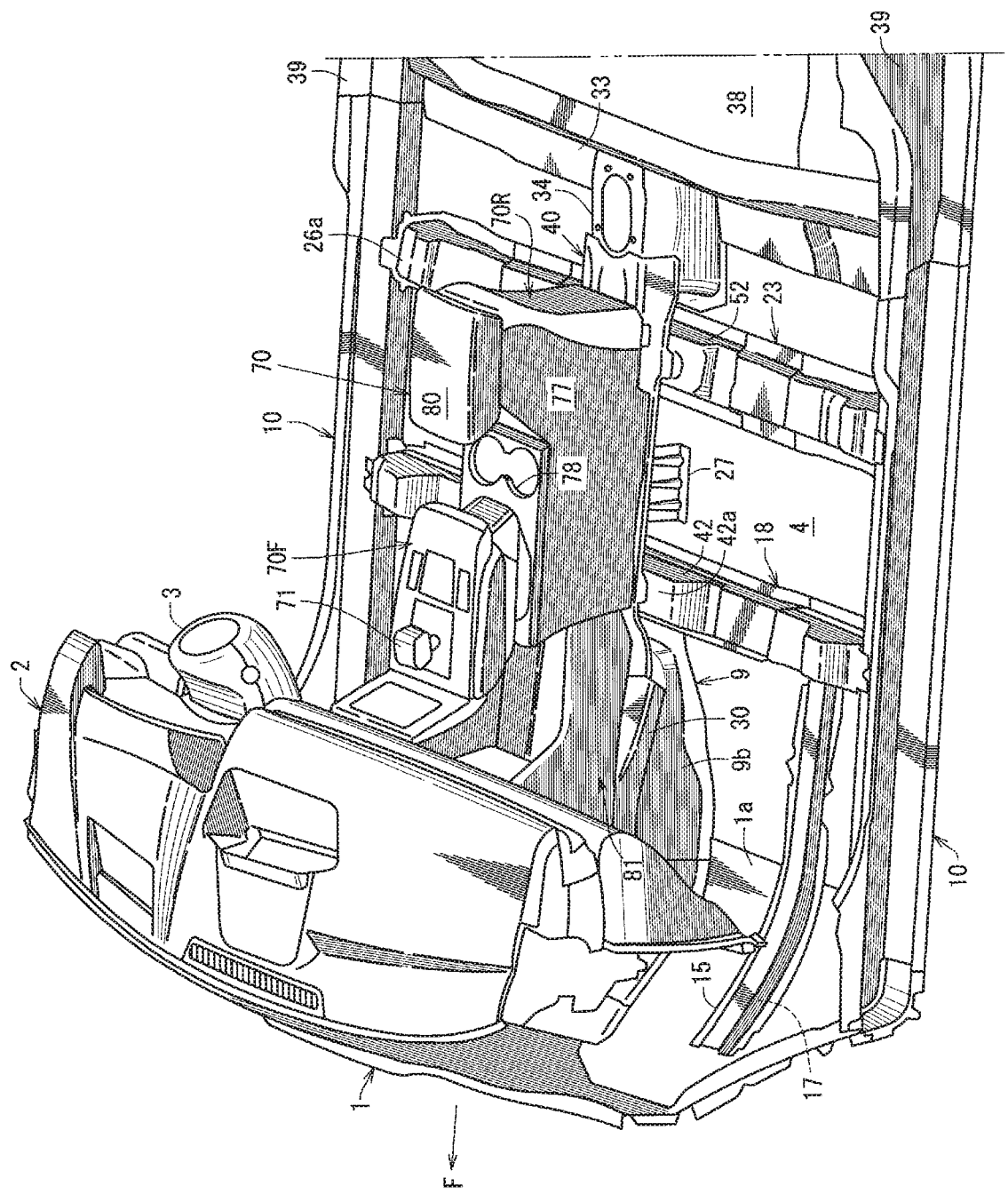
FIG. 1 is a perspective view of a lower vehicle-body structure of an electric vehicle of the present disclosure.
Figure 2:
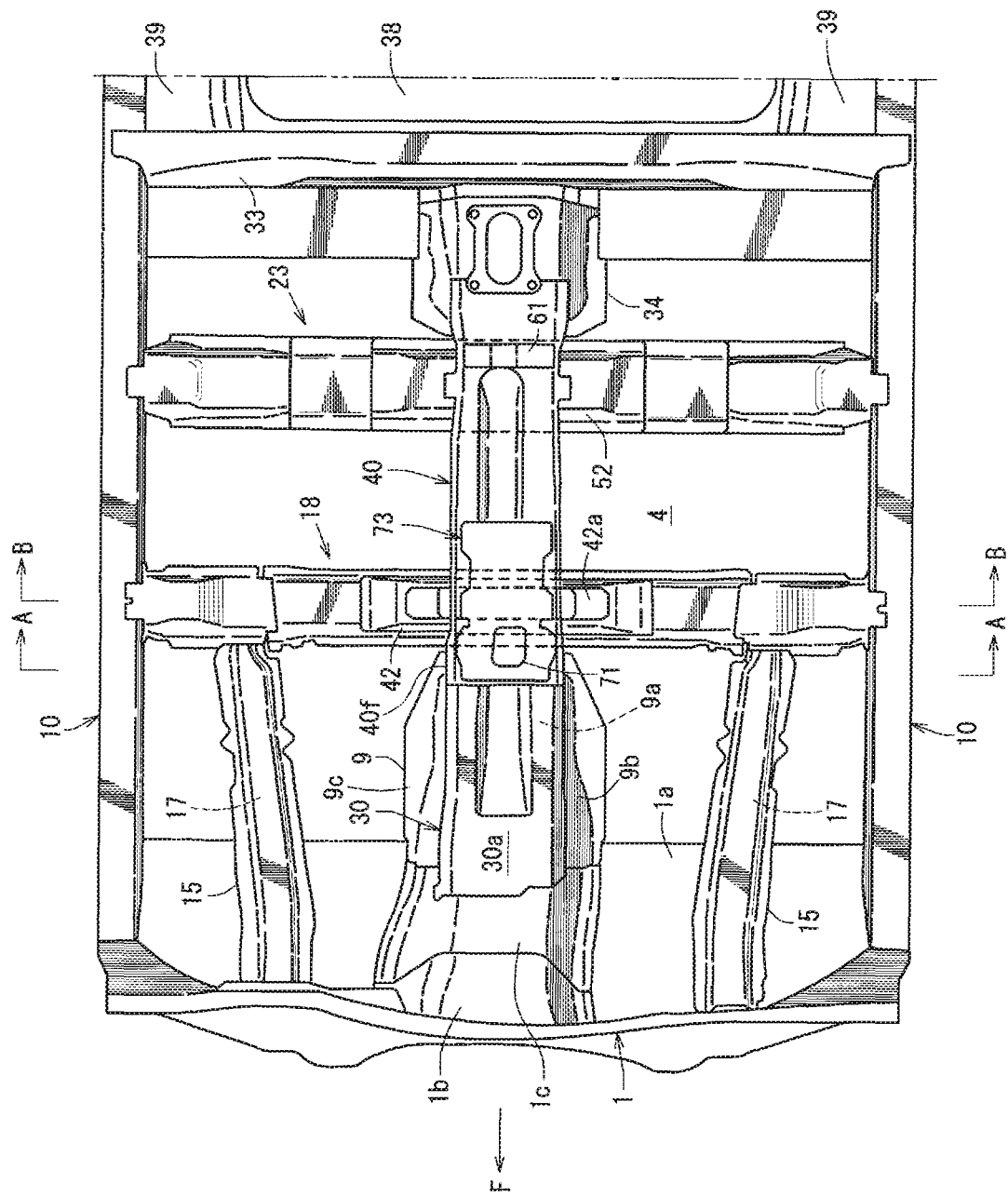
FIG. 2 is a plan view of the lower vehicle-body structure with an instrument panel and a console being removed.
Figure 3:
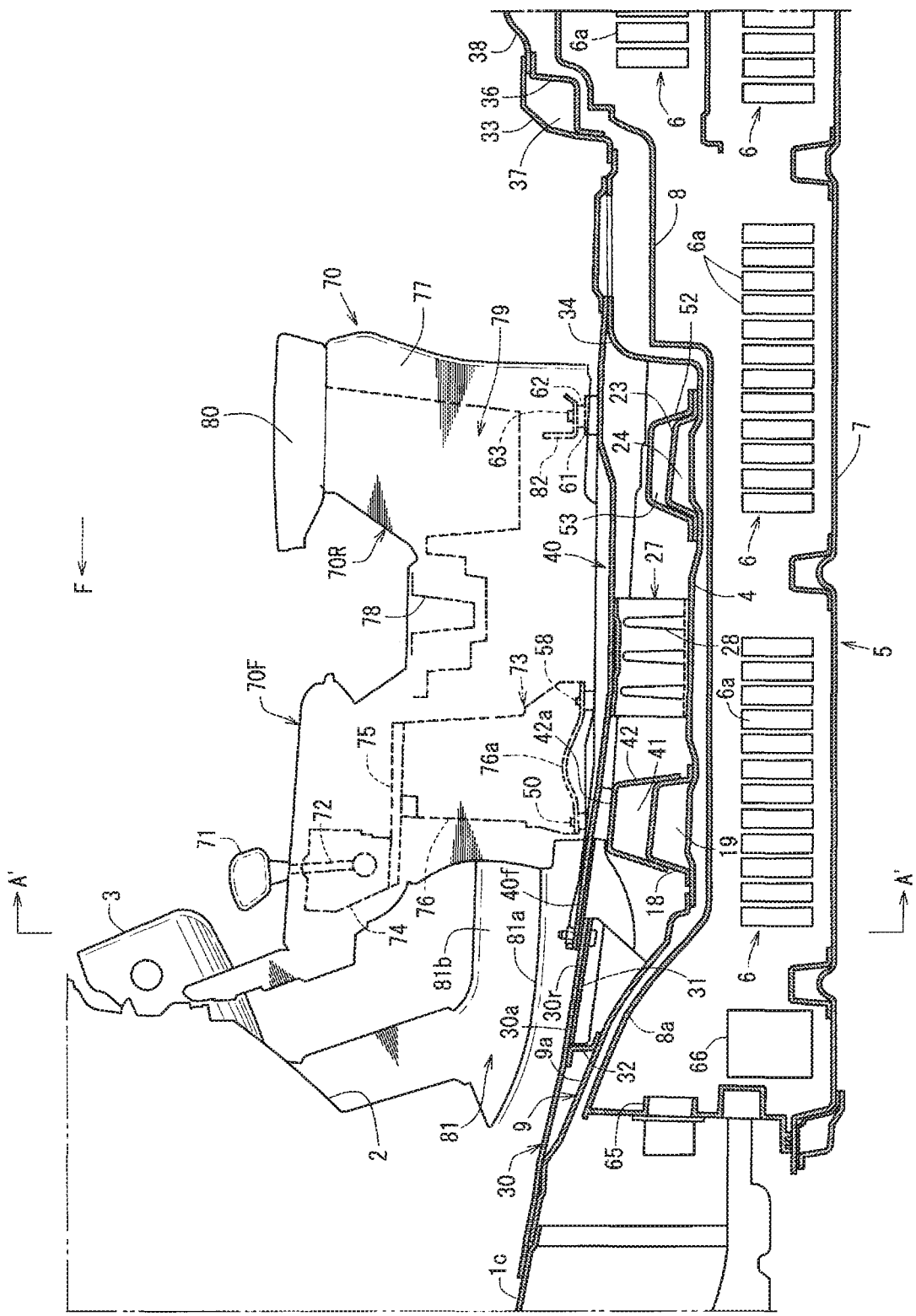
FIG. 3 is a vertical sectional view of the lower vehicle-body structure of the electric vehicle cut in an up-down direction substantially at a middle in a vehicle-width direction.

Now, with reference to the drawings, an embodiment of the present disclosure will be described in detail. The drawings show a lower vehicle-body structure of an electric vehicle, FIG. 1 is a perspective view of the lower vehicle-body structure, FIG. 2 is a plan view of the lower vehicle-body structure with an instrument panel and a console being removed, and FIG. 3 is a vertical sectional view of the lower vehicle-body structure of the electric vehicle cut in an up-down direction substantially at a middle in a vehicle-width direction. In the drawings, an arrow F shows a vehicle front side. The lower vehicle-body structure of the electric vehicle in the embodiment described below is formed substantially symmetrically.

In FIGS. 1 and 2, a dash panel 1 is provided that divides a motor room from a vehicle interior in a vehicle front-rear direction, and an instrument panel 2 is disposed on a vehicle interior side of the dash panel 1 and in front of a front seat. On a driver's seat side of the instrument panel 2 (right front seat side in the vehicle-width direction in this embodiment), a steering column cover 3 is disposed in which a steering column and a steering shaft are provided.

As shown in FIGS. 2 and 3, a substantially flat front floor panel 4 is provided continuously with a lower rear end 1a of the dash panel 1. The front floor panel 4 forms a floor surface of the vehicle interior. A tunnel 9 expanding upward is integrally formed in a front part of the front floor panel 4 at a middle in the vehicle-width direction. The tunnel 9 gradually descends toward a rear side, includes an upper wall 9a and side walls 9b, 9c on opposite sides of the upper wall 9a to form an inverted U-shaped section in front view of the vehicle, and has therein a space opening on a lower side. As shown in FIGS. 2 and 3, tunnel-shaped portions 1b, 1c are formed continuously with the tunnel 9 in a lower part of the dash panel 1 at the middle in the vehicle-width direction As shown in FIG. 3, a battery device (so-called battery pack) 5 as a drive source for vehicle traveling by a motor is disposed below the front floor panel 4. The battery device 5 includes a plurality of battery units 6 including a plurality of battery bodies 6a. The plurality of battery units 6 are arranged in a single-stage structure below the front floor panel 4, and the plurality of battery units 6 are arranged in a two-stage structure below a rear floor pan 38 described later.

The battery device 5 also includes a battery tray 7 that supports the plurality of battery units 6 from below, and a battery case 8 mounted to an upper surface of an outer flange of the battery tray 7 and houses the battery units 6.

As shown in FIG. 3, in a front part of the battery device 5 at the middle in the vehicle-width direction, a cable connection 65 to which a cable is connected extending rearward from a motor (not shown) in the motor room, and a control unit 66 that controls the motor are provided. In a front part of the battery case 8, the control unit 66 is disposed directly in front of the battery tray 7, the cable connection 65 is provided above the control unit 66, and the control unit 66 and the cable connection 65 are arranged in a two-stage structure by the battery tray 7 and the battery case 8.

An expanding portion 8a gradually expanding upward (toward the front floor panel 4) toward a front side is integrally formed in the front part of the battery case 8 at the middle in the vehicle-width direction, that is, in an area corresponding to the cable connection 65 in plan view.

The tunnel 9 gradually expands upward from the front floor panel 4 toward the front side correspondingly to upward expansion of the expanding portion 8a formed in the battery case 8, and an internal space of the tunnel 9 houses the expanding portion 8a.

As shown in FIG. 2, side sills 10,10 each having a closed section and extending in the vehicle front-rear direction are fixedly joined to opposite sides of the front floor panel 4 in the vehicle-width direction.

As shown in FIG. 2, a front cross member (so-called No. 2 cross member) 18 as a floor cross member linearly extending in the vehicle-width direction between the pair of left and right side sills 10, 10 is disposed on an upper surface of the front part of the front floor panel 4 below a front part of the front seat.

As shown in FIG. 3, the front cross member 18 has a hat-shaped section, and is fixedly joined to the front floor panel 4 from above. Thus, a closed section 19 linearly extending in the vehicle-width direction is formed between the front cross member 18 and the front floor panel 4. As shown in FIGS. 1 and 2, the front cross member 18 is formed between the left and right side sills 10, 10 substantially linearly continuously in the vehicle-width direction so as to connect the side sills 10, 10.

As shown in FIGS. 1 to 3, a cross member reinforcing element 42 separate from the front cross member 18 as a floor cross member is fixedly joined to an upper part of the front cross member 18 at the middle in the vehicle-width-direction middle part, specifically, an upper part of a middle member 20 at the middle in the vehicle-width direction, and forms a closed section 41 therein as shown in FIG. 3. Thus, the middle of the front cross member 18 in the vehicle-width direction is elevated by the cross member reinforcing element 42, and forms a substantially horizontal upper surface by an upper wall 42a of the cross member reinforcing element 42.

The front cross member 18 extends in the vehicle-width direction in a position spaced rearward from a rear end of the tunnel 9 expanding upward from the front part of the front floor panel 4.

As shown in FIG. 2, a middle cross member (so-called No. 2.5 cross member) 23 linearly extending in the vehicle-width direction between the pair of left and right side sills 10, 10 is disposed on the upper surface of the front floor panel 4 in a position spaced toward the vehicle rear side from the front cross member 18. The middle cross member 23 is provided in parallel with the front cross member 18.

As shown in FIG. 3, the middle cross member 23 has a hat-shaped section, and joined to the front floor panel 4 from above. Thus, a closed section 24 linearly extending in the vehicle-width direction is formed between the middle cross member 23 and the front floor panel 4.

As shown in FIGS. 1 to 3, a cross member reinforcing element 52 is fixedly joined to an upper part of the middle cross member 23 at the middle in the vehicle-width direction, and forms a closed section 53 therein as shown in FIG. 3. Thus, the middle of the middle cross member 23 in the vehicle-width direction is elevated by the cross member reinforcing element 52.

As shown in FIGS. 1 and 3, between the front cross member 18 and the middle cross member 23 in the vehicle front-rear direction, in other words, on the rear side of the middle of the front cross member 18, a standing bracket 27 fixedly stands upward on the front floor panel 4. The standing bracket 27 has an M-shaped section in front view of the vehicle.

Further, as shown in FIGS. 1 to 3, a kick-up portion reinforcing element 34 that reinforces a kick-up portion 33 is provided on a rear part of the front floor panel 4 at the middle in the vehicle-width direction. The kick-up portion reinforcing element 34 expands upward like a base, and has an upper surface substantially at the same height as upper ends of the front cross member 18 and the standing bracket 27.

As shown in FIG. 3, the kick-up portion 33 extends upward and then extends from its upper end toward the vehicle rear side. A rear cross member 36 (so-called No. 3 cross member) extending in the vehicle-width direction is fixedly joined to a lower part of the kick-up portion 33, and a closed section 37 extending in the vehicle-width direction is formed between the rear cross member 36 and the kick-up portion 33. As shown in FIG. 3, the rear floor pan 38 extending rearward is provided continuously with the kick-up portion 33.

In FIG. 2, reference numeral 39 denotes rear side frames each having a closed section extending in the vehicle front-rear direction on opposite sides of the rear floor pan 38 in the vehicle-width direction. As shown in FIG. 2, a rear end of each side sill 10 extends toward the vehicle rear side to overlap a front end of the rear side frame 39.

As shown in FIGS. 1 and 2, reference numeral 15 denotes a floor frame upper portion extending in the vehicle front-rear direction between the side sill 10 and the tunnel 9 in the vehicle-width direction and fixedly joined across an upper surface of the lower part of the dash panel 1 and the upper surface of the front floor panel 4. The floor frame upper portion 15 forms a closed section 17 extending in the vehicle front-rear direction between the dash panel 1 and the front floor panel 4.

Figure 4:
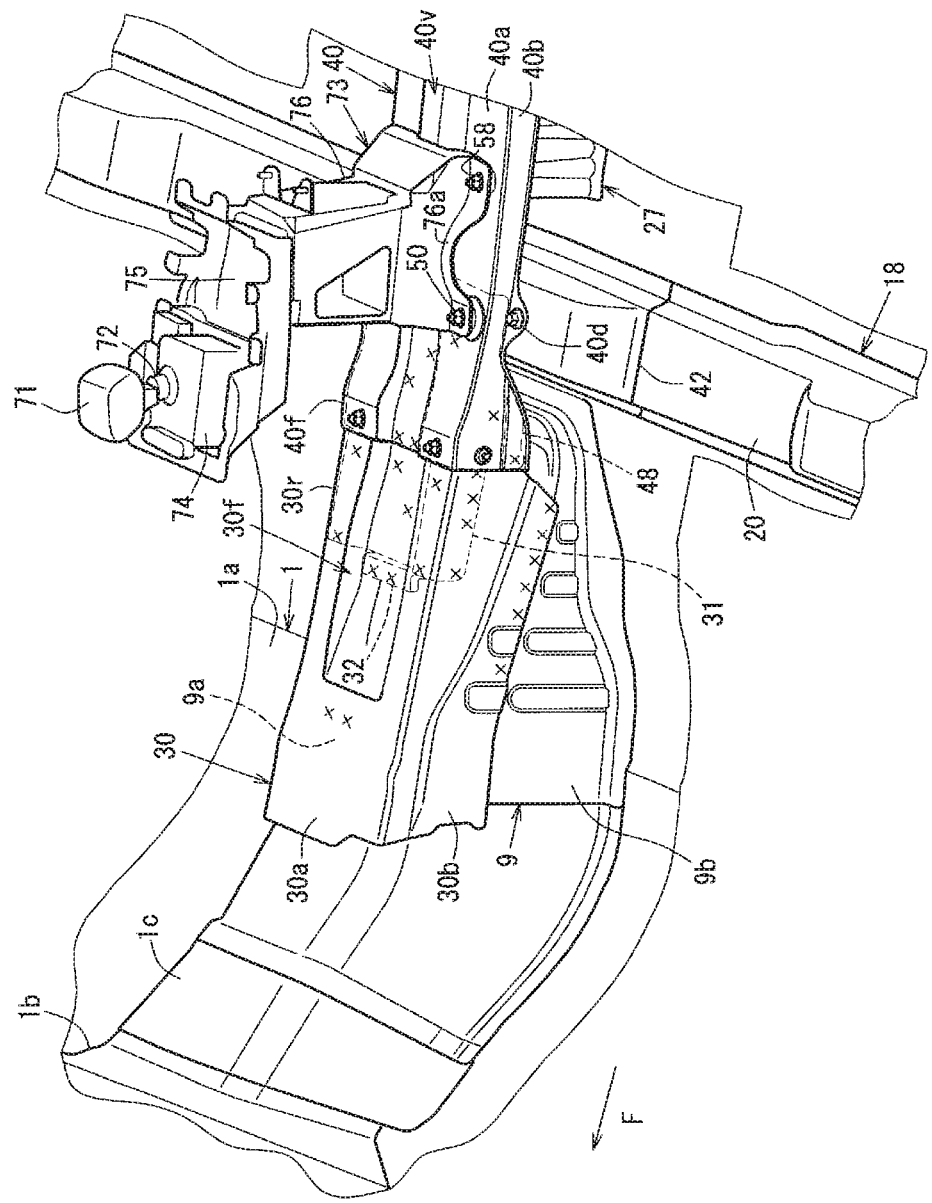
FIG. 4 is a perspective view of essential portions in a front part and a vehicle-width-direction middle part of the lower vehicle-body structure of the electric vehicle.
Figure 5:
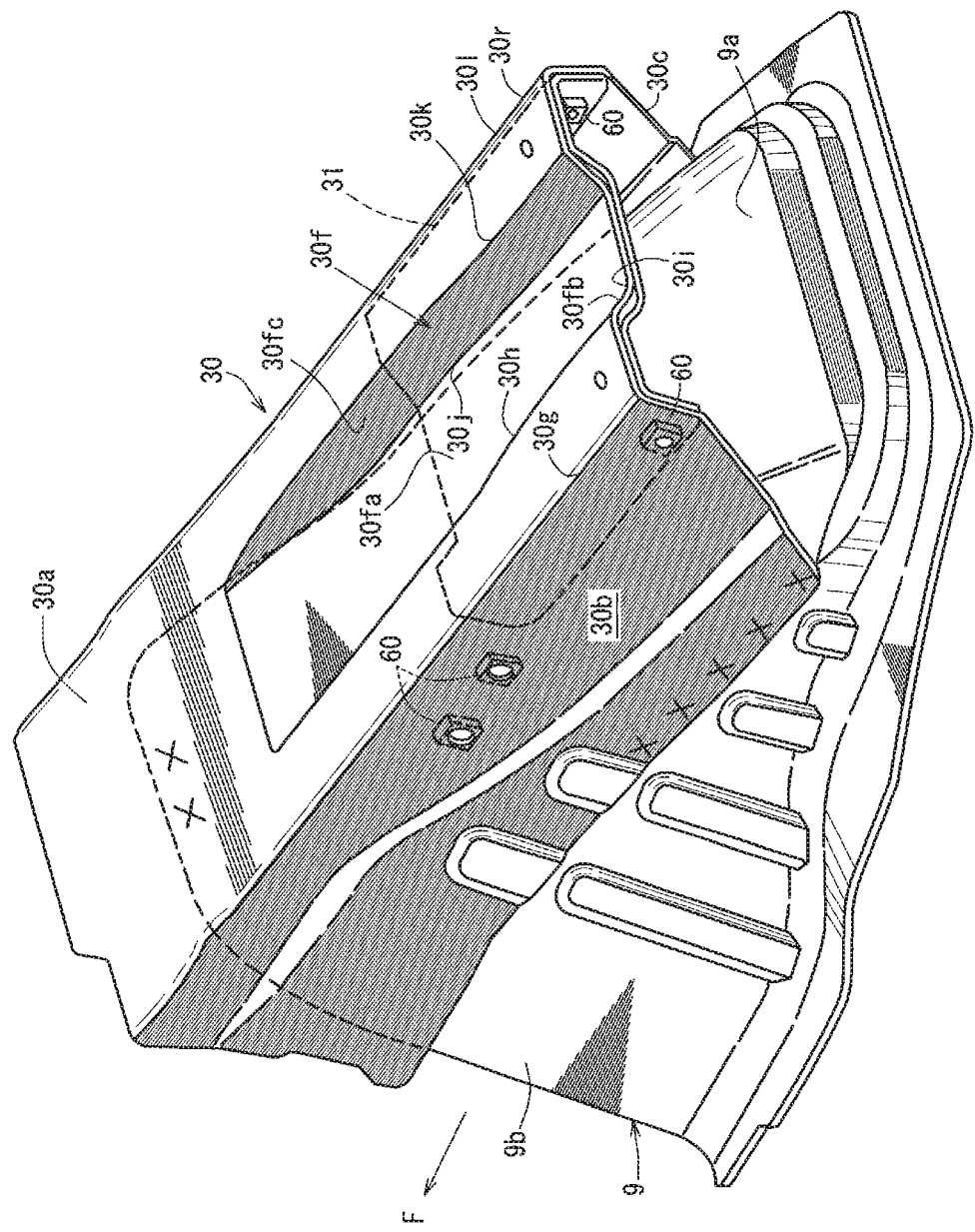
FIG. 5 is a perspective view of a tunnel and a reinforcing bracket.
Figure 6:
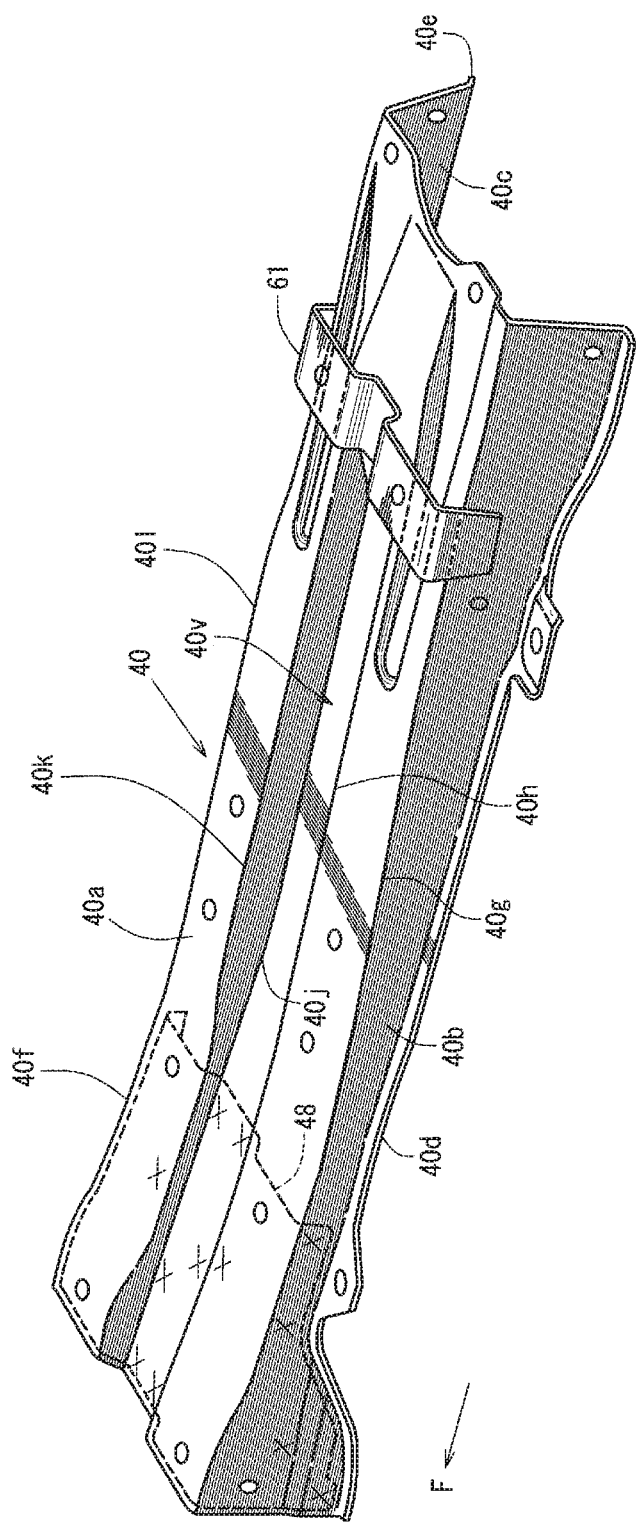
FIG. 6 is a perspective view of a console support bracket.
Figure 7:
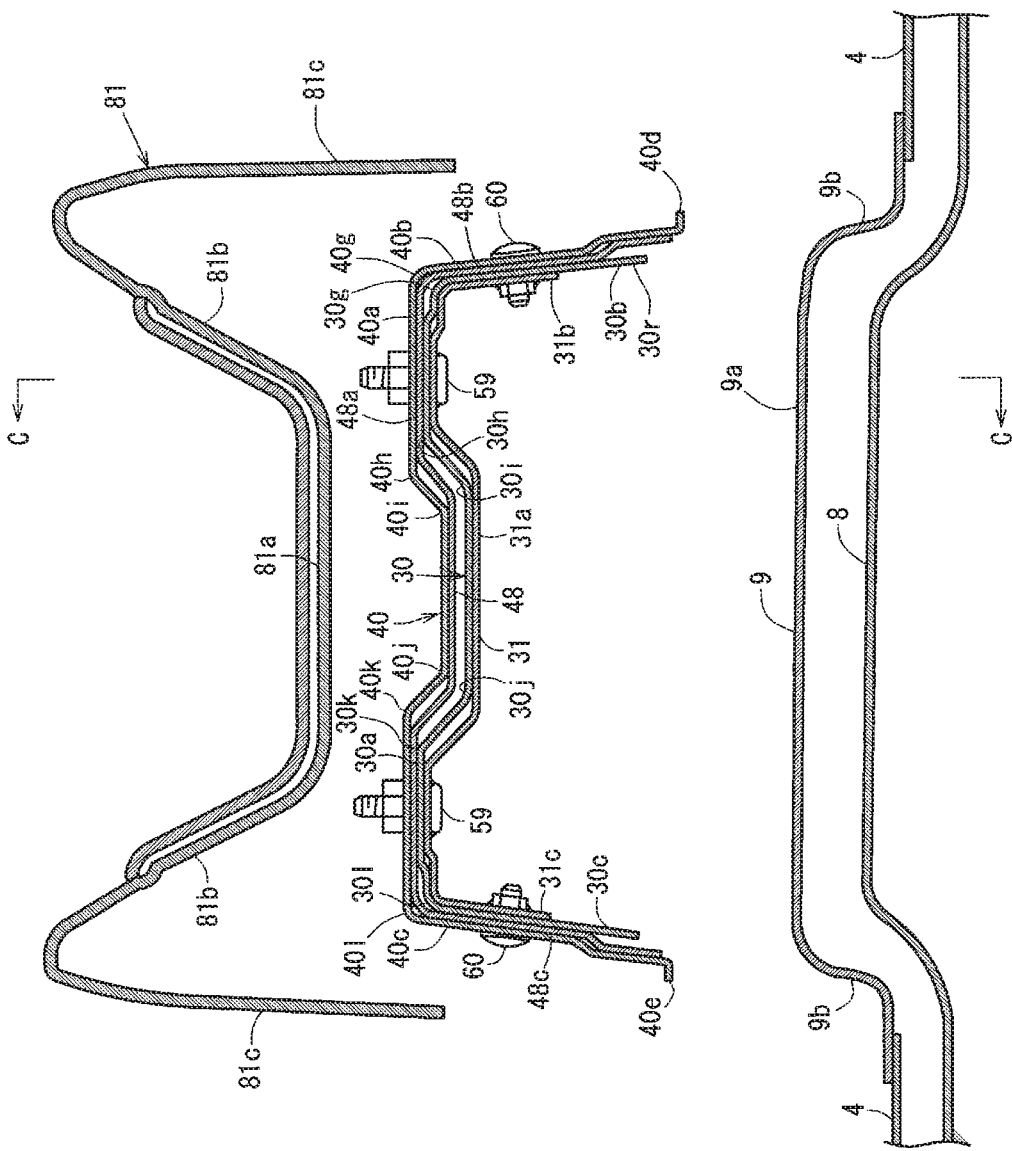
FIG. 7 is an enlarged sectional view of essential portions taken along the line A-A in FIG. 2.
Figure 8:
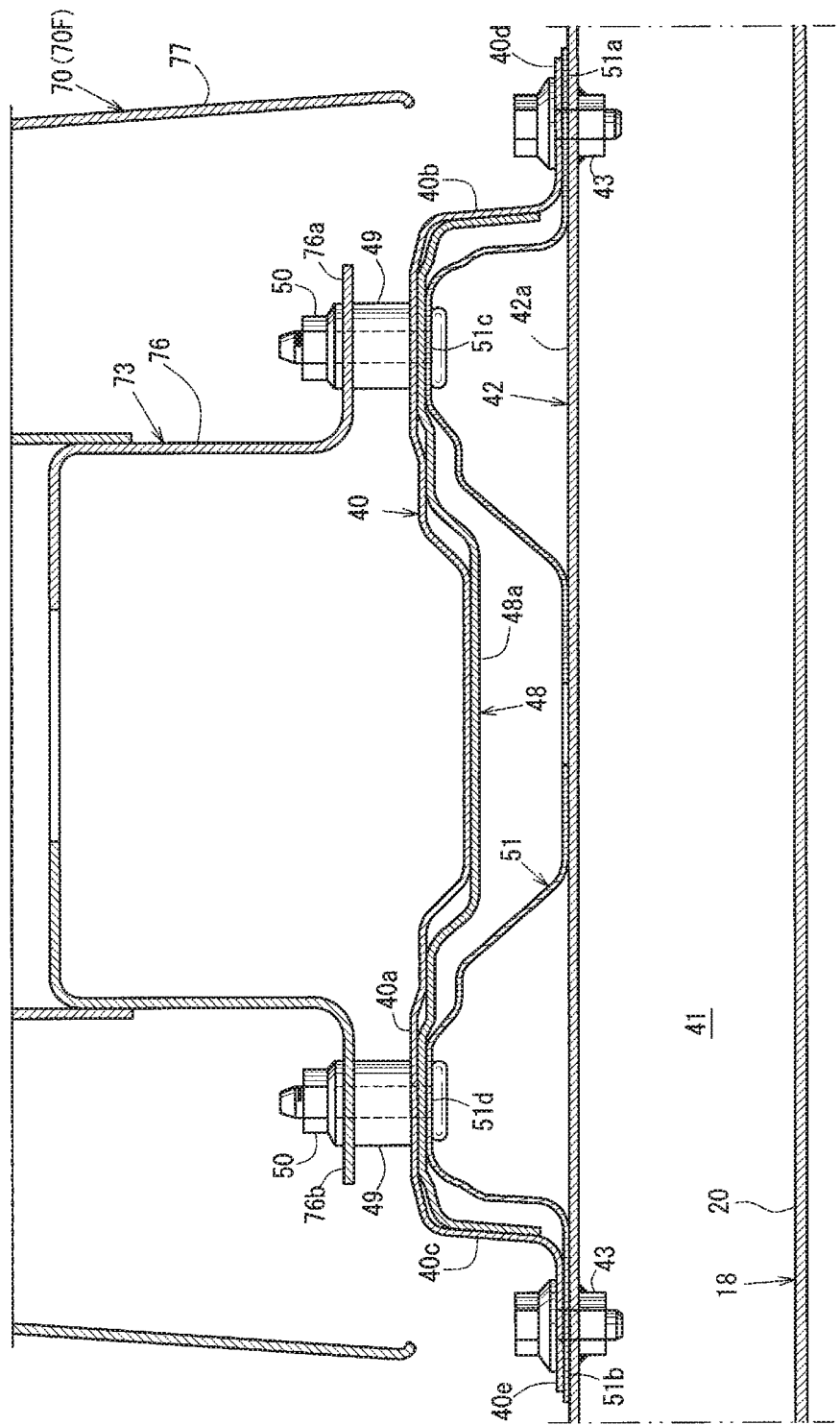
FIG. 8 is an enlarged sectional view of essential portions taken along the line B-B in FIG. 2.
Figure 9:
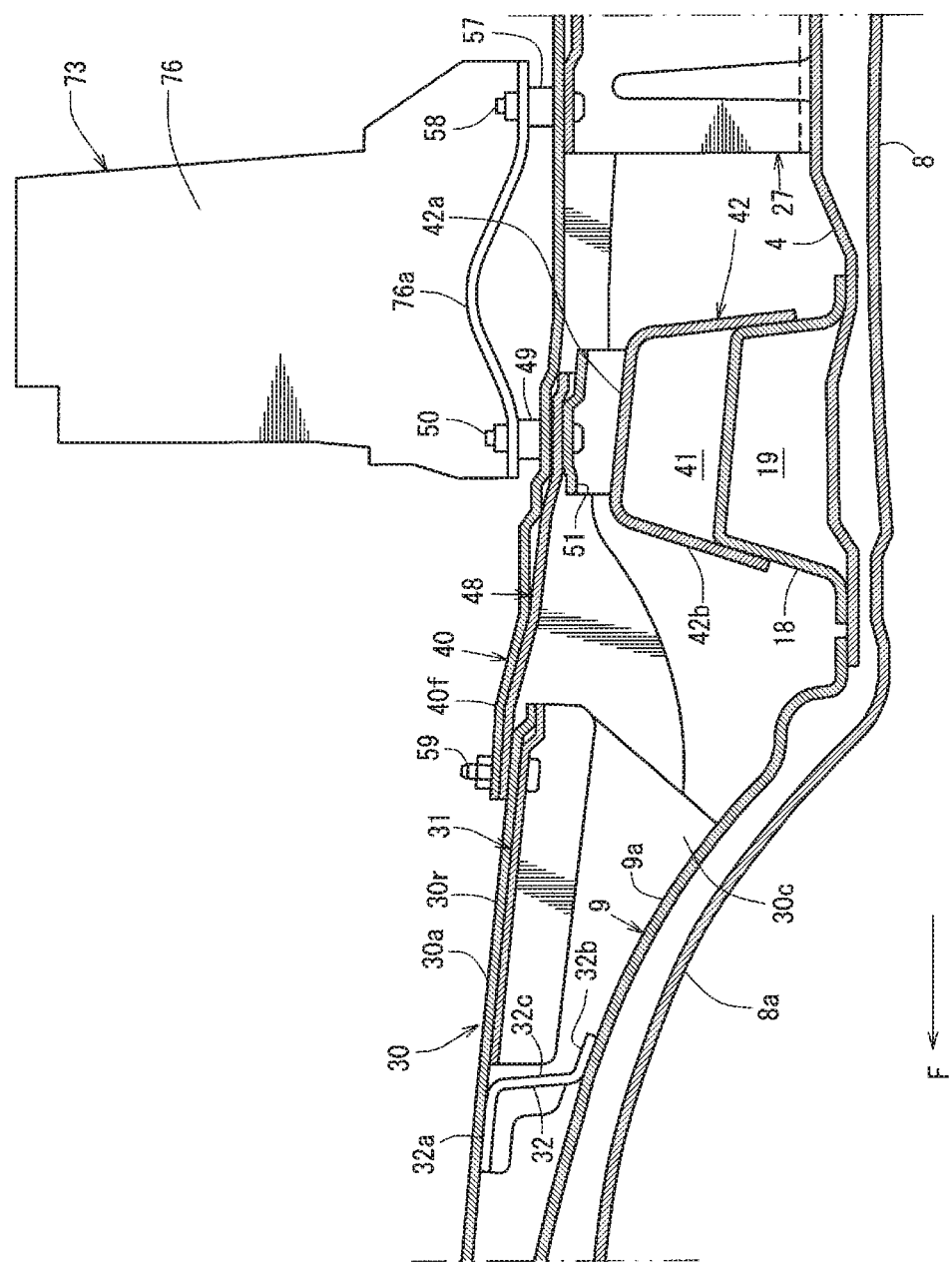
FIG. 9 is a sectional view taken in the direction of arrow C-C in FIG. 7.

FIG. 4 is a perspective view of essential portions around the front part and the vehicle-width-direction middle part of the lower vehicle-body structure of the electric vehicle, FIG. 5 is a perspective view of the tunnel and a reinforcing bracket, FIG. 6 is a perspective view of a console support bracket, FIG. 7 is an enlarged sectional view of essential portions taken along the line A-A in FIG. 2 and along the line A'-A' in FIG. 3, FIG. 8 is an enlarged sectional view of essential portions taken along the line B-B in FIG. 2, and FIG. 9 is a sectional view taken in the direction of arrow C-C in FIG. 7.

As shown in FIGS. 1 to 5, the tunnel 9 expanding upward from the front part of the front floor panel 4 at the middle in the vehicle-width direction includes a tunnel reinforcing bracket 30 that reinforces the tunnel 9.

As shown in FIG. 5, the tunnel reinforcing bracket 30 includes an upper wall 30a and side walls 30b, 30c extending downward from opposite sides of the upper wall 30a in the vehicle-width direction to form an inverted U-shaped section in front view of the vehicle in the vehicle front-rear direction. The upper wall 30a and the left and right side walls 30b, 30c of the tunnel reinforcing bracket 30 are welded to the tunnel 9 so as to cover the tunnel 9 from above (see x in FIG. 5). Thus, the tunnel reinforcing bracket 30 as a vehicle body component is integrally joined to the tunnel 9 (vehicle body).

Specifically, a front part of the upper wall 30a of the tunnel reinforcing bracket 30 is joined to a front part of the upper wall 9a of the tunnel 9, and extends rearward from the front part of the upper wall 9a of the tunnel 9. In a rear extending portion 30r of the tunnel reinforcing bracket 30 extending rearward from a joint between the tunnel reinforcing bracket 30 and the upper wall 9a of the tunnel 9, the upper wall 30a is spaced upward from the upper wall 9a of the tunnel 9 that gradually descends toward the rear side, and extends rearward to substantially above the rear end of the tunnel 9.

The side walls 30b, 30c of the rear extending portion 30r of the tunnel reinforcing bracket 30 are welded to the side walls 9b, 9c of the tunnel 9 along the vehicle front-rear direction as described above.

A vehicle-width-direction middle part of the upper wall 30a of the tunnel reinforcing bracket 30 integrally includes a downward recess 30f. The recess 30f extends from a front part (directly rear area of the joint between the tunnel reinforcing bracket 30 and the upper surface of the tunnel 9) to a rear end of the tunnel reinforcing bracket 30 in the vehicle front-rear direction, and integrally includes a recess bottom 30fa and vertical side walls 30fb, 30fc rising upward from opposite sides of the bottom 30fa.

As shown in FIGS. 5 and 7, by forming the recess 30f, a plurality of ridges 30g, 30h, 30i, 30j, 30k, 30l extending in the front-rear direction are formed in the upper wall 30a of the tunnel reinforcing bracket 30.

As shown in FIGS. 3 to 5, a reinforcement 31 of the tunnel reinforcing bracket as a reinforcing element is provided on a lower surface of a rear part of the tunnel reinforcing bracket 30. As shown in FIG. 7, the reinforcement 31 of the tunnel reinforcing bracket includes an upper wall 31a and side walls 31b, 31c extending downward from opposite sides of the upper wall 31a in the vehicle-width direction to form an inverted U-shaped section correspondingly to the tunnel reinforcing bracket 30, and is welded to the rear part of the tunnel reinforcing bracket 30 from below at a plurality of points (see x in FIG. 4). As shown in FIGS. 4, 5, and 7, a vehicle-width-direction middle part of the upper wall 31a of the reinforcement 31 of the tunnel reinforcing bracket is recessed downward correspondingly to the recess 30f in the tunnel reinforcing bracket 30.

As shown in FIG. 9, directly in front of the reinforcement 31 of the tunnel reinforcing bracket, the upper wall 30a of the tunnel reinforcing bracket 30 and the upper wall 9a of the tunnel 9 are connected by a connecting bracket 32 provided therebetween and having a substantially Z shape in side view.

Specifically, the connecting bracket 32 integrally includes an upper wall 32a extending substantially horizontally, a lower wall 32b extending substantially horizontally in a position spaced downward from the upper wall 32a, and a vertical wall 32c connecting a rear end of the upper wall 32a and a front end of the lower wall 32b in the up-down direction.

Directly in front of the reinforcement 31 of the tunnel reinforcing bracket, the lower wall 32b of the connecting bracket 32 is welded to the upper wall 9a of the tunnel 9 from above, and the upper wall 32a of the connecting bracket 32 is welded to the upper wall 30a of the tunnel reinforcing bracket 30 from below (see x in FIG. 4).

As shown in FIGS. 2 and 3, on the rear side of the tunnel reinforcing bracket 30 as a vehicle body component on the tunnel 9, a console support bracket 40 as a vehicle component is provided extending in the vehicle front-rear direction from the rear part of the tunnel reinforcing bracket 30 to a front part of the kick-up portion reinforcing element 34. The console support bracket 40 supports a console 70, and is supported by and mounted across the middle of the front cross member 18 in the vehicle-width direction, the upper part of the standing bracket 27, and the middle of the middle cross member 23 in the vehicle-width direction. Front and rear ends of the console support bracket 40 are mounted to the tunnel reinforcing bracket 30 and the kick-up portion reinforcing element 34, respectively.

Specifically, the console support bracket 40 is a vehicle component fastened to the vehicle body (front cross member 18, standing bracket 27, middle cross member 23, and kick-up portion reinforcing element 34) after the tunnel reinforcing bracket 30 is mounted.

As shown in FIG. 3, the console 70 includes a shift lever support bracket 73 that supports a shift lever 72 with a shift knob 71 in its upper part and has a lower part secured to the console support bracket 40 at front and rear.

As shown in FIG. 3, the shift lever support bracket 73 integrally includes an upper bracket 74 that supports the shift lever 72, a middle bracket 75, and a base bracket 76.

The entire console 70 is covered with an exterior member 77, and includes a front console 70F on the front side of the base bracket 76, and a rear console 70R on the rear side of the base bracket 76.

As shown in FIG. 3, a cup holder 78 is formed in an upper part of the rear console 70R directly on the rear side of the base bracket 76, and an arm rest 80 openably/closably covers an article compartment 79 formed on the rear side of the cup holder 78.

As shown in FIGS. 1, 3, and 7, a bottom console 81 is provided between a lower front end of the front console 70F and a lower part of the instrument panel 2.

As shown in FIG. 7, the bottom console 81 integrally includes a bottom wall 81a located at the middle in the vehicle-width direction, inner walls 81b rising upward from left and right ends of the bottom wall 81a in the vehicle-width direction, and outer walls 81c extending downward from upper ends of the inner walls 81b. The bottom console 81 covers the front part of the console support bracket 40 and the tunnel reinforcing bracket 30 from above.

Further, as shown in FIGS. 3 and 6, a mounting bracket 61 having an inverted U-shaped section in front view of the vehicle is provided on the rear part of the console support bracket 40. As shown in FIG. 3, a bracket 82 on the side of the rear console 70R is mounted to the mounting bracket 61 by a mount rubber 62 and a mounting member 63 such as a bolt and a nut.

As shown in FIGS. 6 and 7, the console support bracket 40 integrally includes an upper wall 40a, left and right side walls 40b, 40c, and flanges 40d, 40e extending outward in the vehicle-width direction from lower ends of the side walls 40b, 40c to form an inverted U-shaped section in front view of the vehicle.

As shown in FIGS. 4 and 6, a vehicle-width-direction middle part of the upper wall 40a of the console support bracket 40 integrally includes a downward recess 40v. The recess 40v extends from a front end to near a rear end of the console support bracket 40 in the vehicle front-rear direction. As shown in FIGS. 6 and 7, by forming the recess 40v, a plurality of ridges 40g, 40h, 40i, 40j, 40k, 40l extending in the front-rear direction are formed in the upper wall 40a of the console support bracket 40.

As shown in FIG. 4, the recess 40v formed in the upper wall 40a of the console support bracket 40 and the recess 30f formed in the upper wall 30a of the tunnel reinforcing bracket 30 continuously extend in the vehicle front-rear direction, and the plurality of ridges 30h, 40h, 30i, 40i, 30j, 40j, 30k, 40k formed in the tunnel reinforcing bracket 30 and the console support bracket 40 continuously extend in the front-rear direction.

Further, the console support bracket 40 and the tunnel reinforcing bracket 30 each have the inverted U-shaped section, and the ridges 40g, 40l of the console support bracket 40 and the ridges 30g, 30l of the tunnel reinforcing bracket 30 formed accordingly extend continuously in the front-rear direction.

As shown in FIGS. 6 and 7, in the front part of the console support bracket 40, a reinforcement 48 of the console support bracket as a reinforcing element is provided that reinforces the front part from below. As shown in FIG. 7, the reinforcement 48 of the console support bracket includes an upper wall 48a and side walls 48b, 48c extending downward from opposite sides of the upper wall 48a in the vehicle-width direction to form an inverted U-shaped section correspondingly to the console support bracket 40 having the inverted U-shaped section, and is welded to the front part of the console support bracket 40 from below at a plurality of points (see x in FIG. 6). A vehicle-width-direction middle part of the upper wall 48a of the reinforcement 48 of the console support bracket is recessed downward correspondingly to the recess 40v.

As shown in FIGS. 4 and 8, the front part of the console support bracket 40 is fixedly joined to the upper end of the front cross member 18. In this embodiment, as shown in FIG. 8, the flanges 40d, 40e on the front side of the left and right side walls 40b, 40c of the console support bracket 40 are fastened by fastening members 43 such as bolts and nuts to the upper wall 42a of the cross member reinforcing element 42 provided on the front cross member 18 via a reinforcing and supporting bracket 51.

The reinforcing and supporting bracket 51 is provided on a part of the front cross member 18, and supports the console support bracket 40 from below between the console support bracket 40 and the upper wall 42a of the cross member reinforcing element 42.

The reinforcing and supporting bracket 51 fixedly stands on the upper surface of the upper wall 42a of the cross member reinforcing element 42, includes upper walls 51c, 51d extending horizontally at an interval in the vehicle-width direction, and flanges 51a, 51b extending horizontally on the lower side and the outer sides in the vehicle-width direction of the two upper walls 51c, 51d, and has an M-shaped section in front view of the vehicle.

The upper wall 40a of the console support bracket 40 is co-fastened to the upper walls 51c, 51d of the reinforcing and supporting bracket 51 with the upper wall 48a of the reinforcement 48 of the console support bracket therebetween so that the three walls overlap.

As shown in FIG. 8, the left and right flanges 40d, 40e of the console support bracket 40 are co-fastened by the fastening members 43 to the upper wall 42a of the cross member reinforcing element 42 with the left and right flanges 51a, 51b of the reinforcing and supporting bracket 51 therebetween.

As such, the upper wall 40a and the opposite side walls 40b (40d), 40c (40e) in the front part of the console support bracket 40 are joined to the upper end of the front cross member 18, that is, the upper surface of the upper wall 42a of the cross member reinforcing element 42 provided on the front cross member 18 via the reinforcement 48 of the console support bracket and the reinforcing and supporting bracket 51.

As shown in FIGS. 3, and 4 to 9, the shift lever support bracket 73 supports the shift lever 72, and is secured across the cross member reinforcing element 42 on the front cross member 18 and the front part of the standing bracket 27.

As shown in FIGS. 8 and 9, a front part of the base bracket 76 of the shift lever support bracket 73 is mounted to the console support bracket 40 above the front cross member 18 by mount rubbers 49 and mounting members 50 including bolts and nuts.

Specifically, as shown in FIG. 8, left and right lower parts of the base bracket 76 of the shift lever support bracket 73 integrally include flanges 76a, 76b. The flanges 76a, 76b are fastened to upper surfaces of the mount rubbers 49 by the mounting members 50 to mount the shift lever support bracket 73 to the console support bracket 40 at left and right.

Thus, a securing portion on the front side of the shift lever support bracket 73 is mounted, at left and right, to the cross member reinforcing element 42 via the console support bracket 40, the reinforcement 48 of the console support bracket, and the reinforcing and supporting bracket 51 by the mount rubbers 49 and the mounting members 50.

On the other hand, a securing portion on the rear side of the shift lever support bracket 73 is mounted, at the left and right flanges 76a, 76b of the base bracket 76 (see FIG. 8), to the upper wall of the standing bracket 27 via the console support bracket 40 and the reinforcement 48 of the console support bracket as shown in FIGS. 4 and 9 by mount rubbers 57, 57 and mounting members 58 such as bolts and nuts like the securing portion on the front side.

As shown in FIGS. 4 and 9, the front part of the console support bracket 40 extends further forward from the front surface of the front cross member 18. A front extending portion 40f of the console support bracket 40 substantially horizontally extends forward at a height spaced upward from the front floor panel 4 until a front end thereof reaches above the rear part of the tunnel 9. The reinforcement 48 of the console support bracket is provided across the front extending portion 40f of the console support bracket 40 and the front cross member 18 in the vehicle front-rear direction.

As shown in FIGS. 4, 7, and 9, a front part of the front extending portion 40f of the console support bracket 40 is disposed to cover, together with a front part of the reinforcement 48 of the console support bracket, a rear part of the rear extending portion 30r of the tunnel reinforcing bracket 30. Thus, as shown in FIG. 7, the upper walls 30a, 48a and the opposite side walls 30b, 30c, 48b, 48c of the tunnel reinforcing bracket 30 and the reinforcement 48 of the console support bracket overlap.

On the upper side of the overlapping portion, the upper wall 40a of the console support bracket 40, the upper wall 48a of the reinforcement 48 of the console support bracket, the upper wall 30a of the tunnel reinforcing bracket 30, and the upper wall 31a of the reinforcement 31 of the tunnel reinforcing bracket are fastened by fastening members 59 such as bolts and nuts. Further, on the lateral sides of the overlapping portion, the side walls 40b, 40c of the console support bracket 40, the side walls 48b, 48c of the reinforcement 48 of the console support bracket, the side walls 30b, 30c of the tunnel reinforcing bracket 30, and the side walls 31b, 31c of the reinforcement 31 of the tunnel reinforcing bracket are fastened by fastening members 60 such as bolts and nuts.

Thus, as shown in FIG. 9, the tunnel reinforcing bracket 30 and the console support bracket 40 provided on the rear side of the tunnel reinforcing bracket 30 are connected in the position spaced upward from the front floor panel 4.

Specifically, the rear extending portion 30r of the tunnel reinforcing bracket 30 extends rearward from the joint between the tunnel reinforcing bracket 30 and the upper wall 9a of the tunnel 9 toward the upper end of the front cross member 18, and is connected to the upper end of the front cross member 18 via the console support bracket 40.

Further, the reinforcement 31 of the tunnel reinforcing bracket is joined to the tunnel reinforcing bracket 30, the reinforcement 48 of the console support bracket is joined to the console support bracket 40 and the front cross member 18, and further the reinforcement 31 of the tunnel reinforcing bracket and the reinforcement 48 of the console support bracket are connected by the fastening members 59, 60 (see FIG. 7). Thus, the reinforcement 31 of the tunnel reinforcing bracket and the reinforcement 48 of the console support bracket are mounted to the front cross member 18 across the tunnel reinforcing bracket 30 and the console support bracket 40.

The lower vehicle-body structure of the electric vehicle of this embodiment described above includes: the dash panel 1; the front floor panel 4 (floor) having the tunnel 9 formed in the front part below the dash panel 1 at the middle in the vehicle-width direction, the tunnel 9 housing the expanding portion 8a expanding upward of the battery unit 6 disposed below the front floor panel 4; and the front cross member 18 (floor cross member) spanning, above the front floor panel 4, between the side sills 10, 10 disposed on the opposite sides of the front floor panel 4, the rear end of the tunnel 9 is located directly in front of the front cross member 18, and the reinforcing brackets (in this embodiment, the tunnel reinforcing bracket 30 and the console support bracket 40) are provided extending from the tunnel 9 toward the upper end of the front cross member 18, that is, toward the upper surface of the upper wall 42a of the cross member reinforcing element 42 provided on the front cross member 18, and connected to the upper end of the front cross member 18 (upper surface of the upper wall 42a) (see FIGS. 3, 4, and 9).

The above described configuration can increase resistance to lateral collision and also improve front-end collision load transfer performance of the tunnel 9.

As an aspect of the present disclosure, the reinforcing bracket includes the tunnel reinforcing bracket 30 extending rearward from the tunnel 9, and the console support bracket 40 provided on the rear side of the tunnel reinforcing bracket 30 and connected to the rear part of the tunnel reinforcing bracket 30 and the front cross member 18 on the rear side of the tunnel reinforcing bracket 30 (see FIGS. 3 to 7 and 9).

The above described configuration can transfer a front-end collision load further to the rear side via the console support bracket.

As an aspect of the present disclosure, the tunnel reinforcing bracket 30 is connected to the upper end of the front cross member 18 via the console support bracket 40 (see FIGS. 3, 4, 8, and 9).

According to the above described configuration, the console support bracket 40 is connected to the front cross member 18, and thus the front-end collision load can be transferred to the front cross member 18 via the tunnel reinforcing bracket 30 and the console support bracket 40.

As an aspect of the present disclosure, the tunnel reinforcing bracket 30 and the console support bracket 40 include the opposite side walls 30b, 30c, 40b, 40c and the upper walls 30a, 40a to form the inverted U-shaped sections (see FIGS. 5 to 7), the opposite side walls 30b, 30c and the upper wall 30a of the tunnel reinforcing bracket 30 are welded to the tunnel 9 (see FIG. 5), the opposite side walls 40b, 40c and the upper wall 40a of the console support bracket 40 are connected to the front cross member 18 by the fastening members 43 and the mounting members 50 (fasteners) (see FIG. 8), and the opposite side walls 30b, 30c, 40b, 40c and the upper walls 30a, 40a of the tunnel reinforcing bracket 30 and the console support bracket 40 are connected by the fastening members 59, 60 (fasteners) (see FIG. 7).

As described above, the tunnel reinforcing bracket 30 can be firmly joined to the tunnel 9 by the opposite side walls 30b, 30c and the upper wall 30a being joined to the tunnel 9, and also welded to the tunnel 9 to be configured as a vehicle body component integrally joined to the tunnel 9 (vehicle body).

As described above, the console support bracket 40 can be firmly joined to the front cross member 18 by the opposite side walls 40b, 40c and the upper wall 40a being joined to the front cross member 18, and also joined to the front cross member 18 and the tunnel reinforcing bracket 30 by the fasteners or the like 43, 50, 59, 60 to be configured as a vehicle component that can be retrofitted to the vehicle body component.

Specifically, the reinforcing bracket includes the tunnel reinforcing bracket 30 and the console support bracket 40 separately formed, the tunnel reinforcing bracket 30 is configured as the vehicle body component and the console support bracket 40 is configured as the vehicle component. Thus, even for a structure including the reinforcing bracket provided across the tunnel 9 and the front cross member 18, the front cross member 18 or the like below the reinforcing bracket can be firmly assembled to the front floor panel 4 of the vehicle body component at the time of assembly of the vehicle body.

Specifically, for example, for a reinforcing bracket including the tunnel reinforcing bracket 30 and the console support bracket 40 integrally formed, when a front part of such an integral reinforcing bracket is joined to the tunnel 9 at the time of assembly of the vehicle body, the integral reinforcing bracket extending rearward toward the front cross member 18 is disposed, for example, to cover the front cross member 18.

Thus, at the time of assembly of the vehicle body, the integral reinforcing bracket physically prevents the front cross member 18 from being properly joined to the front floor panel 4 by spot welding or the like, proper welding points cannot be sufficiently ensured between the front cross member 18 and the front floor panel 4, and joining strength between the front cross member 18 and the front floor panel 4 cannot be ensured.

On the other hand, in this embodiment, the reinforcing bracket includes the tunnel reinforcing bracket 30 as the vehicle body component and the console support bracket 40 as the vehicle component separately formed. Thus, at the time of assembly of the vehicle body, the tunnel reinforcing bracket 30 can be previously welded to the tunnel 9, the front cross member 18 can be properly joined to the front floor panel 4 by spot welding or the like, and then the console support bracket 40 can be joined to the tunnel reinforcing bracket 30 and the front cross member 18 by the fasteners or the like 43, 50, 59, 60. As a result, the vehicle body component such as the cross member can be firmly assembled to the front floor panel 4.

According to the above described configuration, the tunnel reinforcing bracket 30 and the console support bracket 40 each have the inverted U-shaped section. Thus, unlike when the tunnel reinforcing bracket 30 and the console support bracket 40 each have, for example, a flat shape, the ridges 30g, 30l can be formed between the opposite side walls 30b, 30c and the upper wall 30a, and the ridges 40g, 40l can be formed between the opposite side walls 40b, 40c and the upper wall 40a.

Further, according to the above described configuration, the tunnel reinforcing bracket 30 and the console support bracket 40 can be firmly connected by the upper walls 30a, 40a, the right side walls 30c, 40c, and the left side walls 30b, 40b being fastened by the fastening members 59, 60.

From the above, even when the reinforcing bracket includes the tunnel reinforcing bracket 30 and the console support bracket 40 separately formed, the front-end collision load can be efficiently transferred from the tunnel reinforcing bracket 30 to the console support bracket 40.

As an aspect of the present disclosure, the recesses 30f, 40v are continuously formed across the upper wall 30a of the tunnel reinforcing bracket 30 and the upper wall 40a of the console support bracket 40 (see FIGS. 4 to 6).

According to the above described configuration, by forming the recess 30f, the plurality of ridges 30h, 30i, 30j, 30k extending in the vehicle front-rear direction can be formed in the upper wall 30a of the tunnel reinforcing bracket 30, and by forming the recess 40v, the plurality of ridges 40h, 40i, 40j, 40k extending in the vehicle front-rear direction can be formed in the upper wall 40a of the console support bracket 40. This can increase section stiffness of the upper walls 30a, 40a and further improve front-end collision load transfer performance.

As an aspect of the present disclosure, the lower vehicle-body structure further includes the reinforcement 31 of the tunnel reinforcing bracket and the reinforcement 48 of the console support bracket (reinforcing element) each including the opposite side walls and the upper wall to form the inverted U-shaped section, and mounted to the front cross member 18 across the tunnel reinforcing bracket 30 and the console support bracket 40 (see FIGS. 3 to 9).

According to the above described configuration, the reinforcing bracket includes the tunnel reinforcing bracket 30 and the console support bracket 40 separately formed, and a connection between the brackets may be reduced in strength. However, the reinforcement 31 of the tunnel reinforcing bracket and the reinforcement 48 of the console support bracket each having the inverted U-shaped section are provided across the tunnel reinforcing bracket 30 and the console support bracket 40, and thus the reinforcing elements 31, 48 can reinforce the connection. This can further improve front-end collision load transfer performance from the tunnel reinforcing bracket 30 to the console support bracket 40.

Further, in this embodiment, as shown in FIGS. 3 and 4, the shift lever support bracket 73 stands on the console support bracket 40 so that the base bracket 76 is offset rearward from the shift lever 72. Specifically, the shift lever 72 is provided to overhang forward from the base bracket 76.

Thus, a mounting portion of the front part of the base bracket 76 to the console support bracket 40 corresponds to a front part of a base of the shift lever support bracket 73, and a moment load may be concentrated on the mounting portion when the shift lever 72 is operated.

In response to this, in this embodiment, the console support bracket 40 is provided with the reinforcing elements 31, 48 each having the inverted U-shaped section and mounted to the front cross member 18. This can reinforce the console support bracket 40 against the load applied from the base bracket 76 when the shift lever 72 is operated.

As an aspect of the present disclosure, the lower vehicle-body structure further includes the connecting bracket 32 connecting the upper wall 9a of the tunnel 9 and the upper wall 30a of the reinforcing bracket above the tunnel 9, that is, the tunnel reinforcing bracket 30 (see FIGS. 3, 4, and 9).

According to the above described configuration, the connecting bracket 32 can prevent displacement between the tunnel 9 and the tunnel reinforcing bracket 30.

Specifically, if a section (space) between the upper wall 9a of the tunnel 9 and the upper wall 30a of the tunnel reinforcing bracket 30 crushes due to front-end collision, a toe board (not shown) may be retracted that is provided as a panel on which a front seat passenger places his/her feet on opposite sides of the lower part of the dash panel 1.

Then, in this embodiment, the connecting bracket 32 connecting the upper wall 9a of the tunnel 9 and the upper wall 30a of the tunnel reinforcing bracket 30 above the tunnel 9 is provided, and thus can function as a joint member that prevents crush of the section between the upper walls 9a, 30a at the time of front-end collision, thereby preventing retraction of the toe board as much as possible.

The present disclosure is not limited to the configuration of the embodiment, but may be implemented in various embodiments. For example, the expanding portion 8a expanding upward (toward the front floor panel 4) is formed in the front part of the battery case 8 at the middle in the vehicle-width direction in the area corresponding to the cable connection 65. However, the expanding portion 8a is not limited to one formed in the area corresponding to the cable connection 65. For example, for an air-cooled battery device 5, an air supply port for taking air from the front part of the battery case 8 into the battery case 8 or a cooling device such as a cooling fan may be provided in the front part of the battery case 8 at the middle in the vehicle-width direction, and the expanding portion 8a may expand upward in an area corresponding thereto.

As long as the tunnel 9 expands upward from the front part of the front floor panel 4 at the middle in the vehicle-width direction, the tunnel 9 is not limited to one expanding to house the expanding portion 8a in its internal space, but may expand to house a different vehicle component or may expand without housing any vehicle component.

What is claimed is:

1. A lower vehicle-body structure of an electric vehicle comprising:
   a dash panel;
   a floor having a tunnel formed in a front part below the dash panel at a middle in a vehicle-width direction, wherein the tunnel houses an expanding portion expanding upward, of a battery unit disposed below the floor; and
   a floor cross member spanning, above the floor, between side sills disposed on opposite sides of the floor,
   wherein
   a rear end of the tunnel is located directly in front of the floor cross member,
   a reinforcing bracket is provided extending from the tunnel toward the floor cross member on a rear side of the tunnel, spaced upward from the floor, and connected to an upper part of the floor cross member,
   the reinforcing bracket includes a tunnel reinforcing bracket extending rearward from the tunnel, and a console support bracket provided on a rear side of the tunnel reinforcing bracket and connected to a rear part of the tunnel reinforcing bracket and the floor cross member on the rear side of the tunnel reinforcing bracket,
   the tunnel reinforcing bracket and the console support bracket are separately formed and partially overlap each other at the rear part of the tunnel reinforcing bracket,
   the tunnel reinforcing bracket and the console support bracket each include opposite side walls and an upper wall to form an inverted U-shaped section in front view of the vehicle, and
   a recess is continuously formed across the upper wall of the tunnel reinforcing bracket and the upper wall of the console support bracket.

2. The lower vehicle-body structure of the electric vehicle according to claim 1, wherein
   the tunnel reinforcing bracket is connected to an upper end of the floor cross member via the console support bracket.

3. The lower vehicle-body structure of the electric vehicle according to claim 2, wherein
   the opposite side walls and the upper wall of the tunnel reinforcing bracket are welded to the tunnel,
   the opposite side walls and the upper wall of the console support bracket are connected to the floor cross member by fasteners, and the opposite side walls and the upper walls of the tunnel reinforcing bracket and the console support bracket are connected by fasteners.

4. The lower vehicle-body structure of the electric vehicle according to claim 3, further comprising:
    a reinforcing element including opposite side walls and an upper wall to form an inverted U-shaped section in front view of the vehicle, and mounted to the floor cross member across the tunnel reinforcing bracket and the console support bracket.

5. The lower vehicle-body structure of the electric vehicle according to claim 1, further comprising:
    a connecting bracket connecting an upper wall of the tunnel and the upper wall of the reinforcing bracket above the tunnel.

6. The lower vehicle-body structure of the electric vehicle according to claim 1, further comprising:
    a reinforcing element including opposite side walls and an upper wall to form an inverted U-shaped section in front view of the vehicle, and mounted to the floor cross member across the tunnel reinforcing bracket and the console support bracket.

7. The lower vehicle-body structure of the electric vehicle according to claim 1, further comprising:
    a connecting bracket connecting an upper wall of the tunnel and the upper wall of the reinforcing bracket above the tunnel.

8. The lower vehicle-body structure of the electric vehicle according to claim 2, further comprising:
    a connecting bracket connecting an upper wall of the tunnel and the upper wall of the reinforcing bracket above the tunnel.

9. The lower vehicle-body structure of the electric vehicle according to claim 3, further comprising:
    a connecting bracket connecting an upper wall of the tunnel and the upper wall of the reinforcing bracket above the tunnel.

10. The lower vehicle-body structure of the electric vehicle according to claim 4, further comprising:
    a connecting bracket connecting an upper wall of the tunnel and the upper wall of the reinforcing bracket above the tunnel.

11. The lower vehicle-body structure of the electric vehicle according to claim 6, further comprising:
    a connecting bracket connecting an upper wall of the tunnel and the upper wall of the reinforcing bracket above the tunnel.

12. The lower vehicle-body structure of the electric vehicle according to claim 4, wherein the reinforcing element comprises a reinforcement of the tunnel reinforcing bracket disposed on a lower surface of the rear part of the tunnel reinforcing bracket.

13. The lower vehicle-body structure of the electric vehicle according to claim 12, wherein a vehicle-width-direction middle part of an upper wall of the reinforcement of the tunnel reinforcing bracket is recessed downward corresponding to the recess in the tunnel reinforcing bracket.

14. The lower vehicle-body structure of the electric vehicle according to claim 4, wherein the reinforcing element comprises a reinforcement of the console support bracket which reinforces a front part of the console support bracket from below.

15. The lower vehicle-body structure of the electric vehicle according to claim 14, wherein a vehicle-width-direction middle part of an upper wall of the reinforcement of the console support bracket is recessed downward corresponding to the recess in the console support bracket.

* * * * *